UNITED STATES PATENT OFFICE.

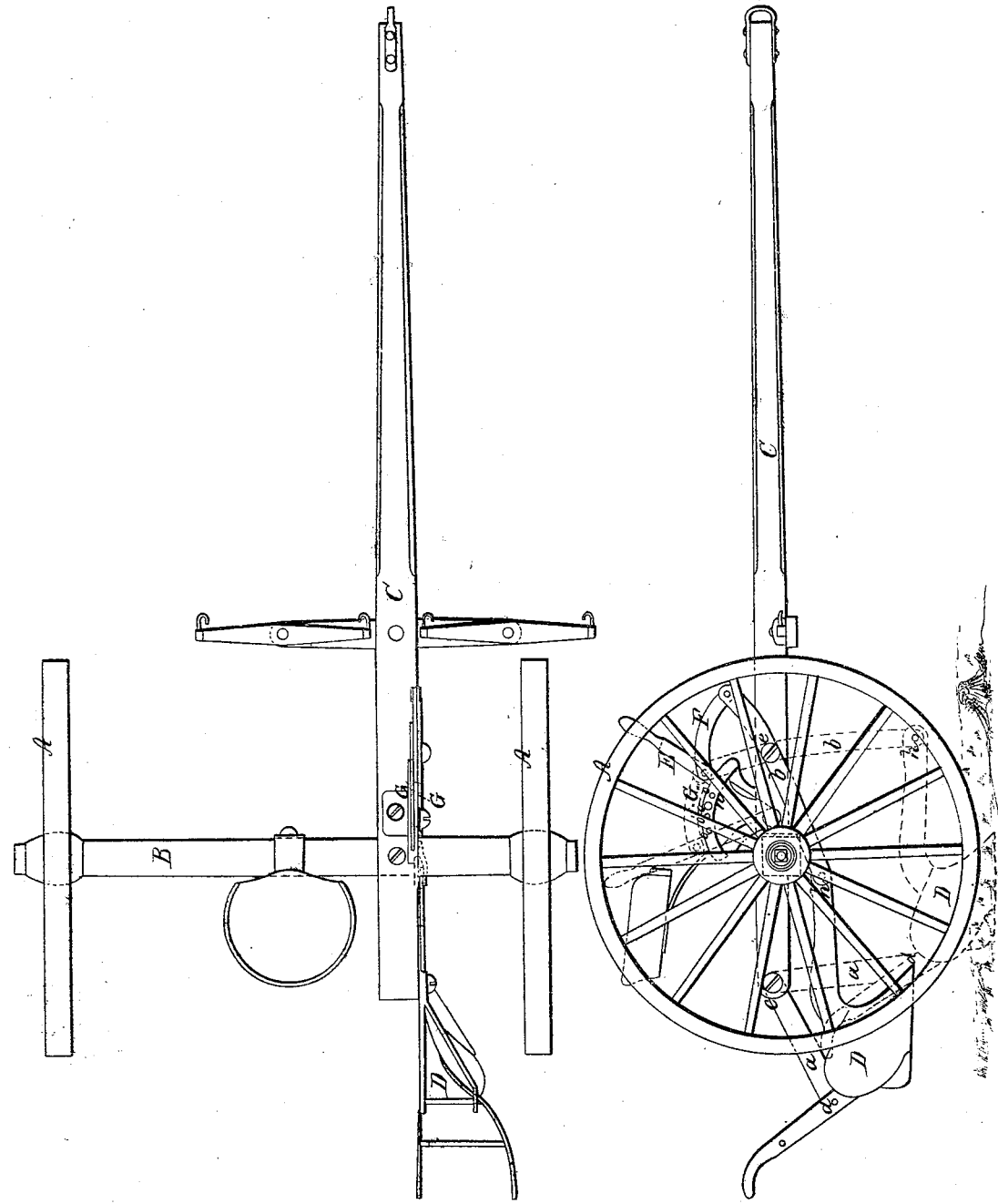

ISAAC F. NUTTING, OF PALMER, MASSACHUSETTS.

IMPROVEMENT IN WHEEL-PLOWS.

Specification forming part of Letters Patent No. 50,837, dated November 7, 1865.

*To all whom it may concern:*

Be it known that I, ISAAC F. NUTTING, of Palmer, Hampden county, Commonwealth of Massachusetts, have invented a new and useful Improvement in Plows; and I do hereby declare that the following is a full and exact description thereof, reference being had to the accompanying drawings, and to letters of reference marked thereon.

In the drawings, Figure 1 is a side view, and Fig. 2 a plan, of my improved plow.

My invention consists of a novel arrangement of a plow in connection with an axle and wheels in such a manner as that it can be raised and lowered, thus adjusting it to any depth of furrow, and also raised entirely from the furrow for convenience in moving to or from the field.

I will now describe the construction and operation of my invention.

It consists of a pair of wheels, A A, and axle B. To this axle B the draft-pole C is attached. This pole C is extended out in the rear of the axle, and to this the plow D is hung by means of the connections $a b$, the connection $a$ being fastened in the rear of the axle to the pivot $c$, and at the rear end of the plow at $d$. The connection $b$ is attached to the plow at $h$, and in front of the axle to the pivot $e$ on the draft-pole. This part $b$ is continued up beyond the pivot and the hand-lever E, attached to it by means of the piece F. This lever E works in curved guides G G', fastened to the draft-pole C, and having the holes $o\ o'$, &c., drilled in them, so as to fasten the lever at any point by means of a pin, $m$. The operation of this is readily seen. It consists in merely moving the lever E backward and forward, thus raising or lowering the plow, as before mentioned. The connections $a$ and $b$ are so arranged that the plow may enter the ground at any depth, but always with its base-line in a horizontal position.

The advantages arising from the use of this arrangement are, that the plow may be easily and readily adjusted to any depth of furrow, or may be taken entirely from the ground. Much better plowing can be done, as the horses may be more easily driven from the seat than from the ground, and I put the work entirely on the horses, no one being needed to hold the plow, and thus avoid much tiresome labor. Any common plow may be attached, as shown in the drawings, thus avoiding some expense to parties already owning common plows. The draft must necessarily be easier from a large part of the weight being supported by the wheels, and the furrows are all of the same depth, if the plow is kept adjusted at the same point.

Now, having described my invention, what I claim as new, and desire to secure by Letters Patent, is—

The combination of the hand-lever E, connections $a\ b$ F, with a plow, D, and axle B, and draft-pole C, when mounted on the wheels A A, substantially in the manner and for the purpose described.

ISAAC F. NUTTING.

Witnesses:
J. B. GARDINER,
W. D. STEVENS.